(12) United States Patent
Gogovitza

(10) Patent No.: US 6,349,607 B1
(45) Date of Patent: Feb. 26, 2002

(54) TRANSFER RING FOR CONTINUOUSLY VARIABLE TRANSMISSION

(75) Inventor: Noru Gogovitza, Toronto (CA)

(73) Assignee: Designco Inc., Mississauga (CA)

( * ) Notice: Subject to any disclaimer, the term of this patent is extended or adjusted under 35 U.S.C. 154(b) by 0 days.

(21) Appl. No.: 09/508,502

(22) PCT Filed: Aug. 31, 1998

(86) PCT No.: PCT/CA98/00827

§ 371 Date: Mar. 22, 2000

§ 102(e) Date: Mar. 22, 2000

(87) PCT Pub. No.: WO99/15811

PCT Pub. Date: Apr. 1, 1999

(30) Foreign Application Priority Data

Sep. 23, 1997 (CA) .............................................. 2216361

(51) Int. Cl.[7] .............................................. F16H 55/02
(52) U.S. Cl. ........................ 74/457; 74/349; 74/447; 74/460; 74/461
(58) Field of Search ........................ 74/348, 349, 447, 74/457, 460, 461

(56) References Cited

U.S. PATENT DOCUMENTS

| | | | |
|---|---|---|---|
| 844,203 A | 2/1907 | Smith ........................... 74/193 |
| 861,069 A | 7/1907 | Wood | |
| 886,911 A | 5/1908 | Wolter | |
| 887,961 A | 5/1908 | Pfeiffer | |
| 934,731 A | 9/1909 | Jenkins | |
| 994,037 A | 5/1911 | Schwartz | |
| 1,159,463 A | 11/1915 | Barr et al. | |
| 1,354,486 A | 10/1920 | Jacques | |
| 1,637,664 A | 8/1927 | Stoeckicht | |
| 1,868,676 A | 7/1932 | Stoeckicht | |
| 2,026,928 A | 1/1936 | Back et al. ................... 74/217 |
| 2,066,758 A * | 1/1937 | Bassoff ..................... 74/461 X |
| 2,875,628 A | 3/1959 | Walter .......................... 74/349 |
| 2,936,641 A | 5/1960 | Voelkl .......................... 74/349 |
| 2,970,494 A | 2/1961 | Lynch ....................... 74/336.5 |
| 3,018,668 A | 1/1962 | Berquist ....................... 74/393 |
| 3,175,410 A | 3/1965 | Dittrich .................... 74/230.17 |
| 3,381,544 A * | 5/1968 | Butler .......................... 74/461 |
| 3,626,453 A | 12/1971 | Riley ........................... 74/193 |
| 3,894,439 A | 7/1975 | Borello ......................... 74/192 |
| 4,183,253 A | 1/1980 | Borello ......................... 74/193 |
| 4,229,985 A | 10/1980 | Borello ......................... 74/192 |
| 4,448,087 A | 5/1984 | Barzel .......................... 74/193 |
| 4,680,985 A | 7/1987 | Troester ....................... 74/785 |
| 4,708,912 A | 11/1987 | Huppman .................... 428/547 |
| 4,841,791 A | 6/1989 | Lopez .......................... 74/190 |
| 5,425,685 A | 6/1995 | Park ............................ 476/55 |
| 5,472,388 A | 12/1995 | Lee et al. ..................... 476/54 |
| 6,055,880 A * | 5/2000 | Gogovitza ................... 74/349 |

FOREIGN PATENT DOCUMENTS

FR 1135629 11/1955

* cited by examiner

Primary Examiner—Allan D. Herrmann
(74) Attorney, Agent, or Firm—Rogers Law Office

(57) ABSTRACT

A transfer ring (10) for a continously variable transmission. The transfer ring (10) includes an inner ring (12), an outer ring (18) and a spacer ring (24). The inner, outer and spacer rings are substantially coaxial with a transfer ring (10) axis. The spacer ring (24) is disposed radially between the inner and outer rings. The inner and outer rings are secured to the spacer ring (24) to substantially prevent relative movement therebetween. The spacer ring (24) has non-overlapping radially inwardly (26) and radially outwardly (27) facing slots extending respectively into inner and outer circumferences thereof. Laminar segments (42) are mounted in each of the slots and are slidably displaceable in a direction parallel to the transfer ring axis (22). The segments (42) are generally radially aligned with the transfer ring axis (22) and have upper (44) and lower (45) tabs straddling the spacer ring (24) to limit the distance which the segments (42) may be slidably displaced.

9 Claims, 6 Drawing Sheets

TRANSFER RING FOR CONTINUOUSLY VARIABLE TRANSMISSION

FIELD OF THE INVENTION

This invention relates to non-slip continuously variable torque transmission devices and more particularly to restorably deformable transfer rings which conform to and transfer torque between input and output torque cones or gearsets.

BACKGROUND

This invention relates to non-slip continuously variable transmissions (CVT's) of the type illustrated and described in my earlier PCT application which was assigned International Application No. PCT/CA97/00002 and published under International Publication No. WO97/26469. A device of a related type is also disclosed in French patent no. 1,135,629 to N.S.U. Werke Aktiengesellschaft (the "NSU device").

Unlike earlier CVT's which were friction devices and could therefore slip, non-slip CVT's of the type relevant to this invention utilize an input gearset of bevel or conical shape (sometimes referred to as "torque cones") which transfers torque to a similarly shaped output gearset or to a ring gear through a transfer ring. The transfer ring has many relatively thin laminations about its periphery which are slidably displaceable in a direction generally perpendicular to the transfer ring itself. The laminations are displaced by "teeth" on the gearsets as they pass between the gearsets to generally conform to the surface shape of the gearsets. In effect therefore the transfer ring is a continually reformable gear, a portion of which gets re-formed as it passes between a gearset.

The transfer ring provides a torque transfer medium having the benefit of a gear type of device in that it transfers torque in a manner similar to the meshing of gears. In other words, torque transfer is substantially mechanical rather than frictional. The transfer ring furthermore will adapt to the pitch anywhere along a gearset by reforming every time it passes through the gearset. The transfer ring can therefore be moved laterally between the input and output gearsets to vary the torque transfer ratio which is a function of the relative diameters of the input and output gearsets at the point of "meshing" with the transfer ring.

In order to be viable, a transfer ring must be robust, simple to manufacture and assemble, capable of being balanced for relatively high speed operation and exhibit a minimum amount of backlash.

The NSU design provides a transfer ring with inner and outer support rings. Generally C shaped laminations are carried between the support rings. The inner support ring has outwardly extending projections straddled by the open end of the C shaped laminations. The outer support ring has inwardly extending projections which are straddled by the open end of the C shaped laminations. The inner and outer rings are not rigidly secured to one another in the NSU design therefore creating severe shortcomings with respect to capability of being balanced for high speed operations and backlash.

My earlier design overcomes some of the inherent shortcomings of the NSU design by rigidly securing inner and outer support rings to one another by radially extending fixed laminations somewhat analogous to spokes on a wheel. One advantage of rigidly securing the inner and outer support rings in that movement therebetween is eliminated thereby reducing backlash. Additionally the inner and outer support rings are maintained in a fixed concentric arrangement making balancing for higher speed operation possible. Furthermore the presence of the fixed laminations reduces the total amount of space available for backlash.

The presence of fixed laminations secured, typically by welding, to the inner and outer support rings does present some problems. Firstly the movable laminations must be in place prior to securing the fixed laminations. The presence of the movable laminations limits access to the fixed laminations for welding. Furthermore the inner and outer support rings must be held concentrical during welding to ensure good fit and balance. Finally the torque transfer capability of the transfer ring is dependent on the strength of the fixed laminations which would suggest the use of relatively thick members however this is contrary to the desirability of thin members to limit gaps between the movable laminations as they pass between the gearsets.

It is an object of the present invention to provide a transfer ring assembly for a non-slip CVT which positively maintains a fixed spatial arrangement between inner and outer rings without requiring fixed laminations to be welded therebetween.

It is a further object of the present invention to provide a member for carrying movable laminations which limits circumferential displacement of the movable laminations and transfers force from the movable laminations simultaneously to the inner and outer rings.

It is a still further object of the present invention to provide a transfer ring assembly which is made up of relatively simple to manufacture components which are easy to assemble without requiring a special fixture to maintain concentricity between inner and outer rings during assembly.

These and other objects and advantages of the present invention will be apparent upon reviewing the detailed description set out below.

SUMMARY OF THE INVENTION

A transfer ring for a continuously variable transmission, said transfer ring comprising:

an inner ring;

an outer ring;

a spacer ring;

said inner, outer and spacer rings being substantially coaxial with a transfer ring axis with said spacer ring disposed radially between said inner ring and said outer ring;

said inner and outer rings being secured to said spacer ring to substantially prevent relative movement therebetween;

said spacer ring having a plurality of alternating, non-overlapping, radially inwardly and radially outwardly facing slots extending respectively into inner and outer circumferences thereof; and, a plurality of laminar segments slidably mounted in each of said radially inwardly and radially outwardly facing slots, said segments being generally radially aligned with and slidable generally parallel to said transfer ring axis and having upper and lower tabs straddling said spacer ring to limit the distance said segments may be slidably displaced.

DESCRIPTION OF DRAWINGS

Preferred embodiments of the invention are described below with reference to the accompanying drawings in which.

DESCRIPTION OF PREFERRED EMBODIMENTS

Figure 1:
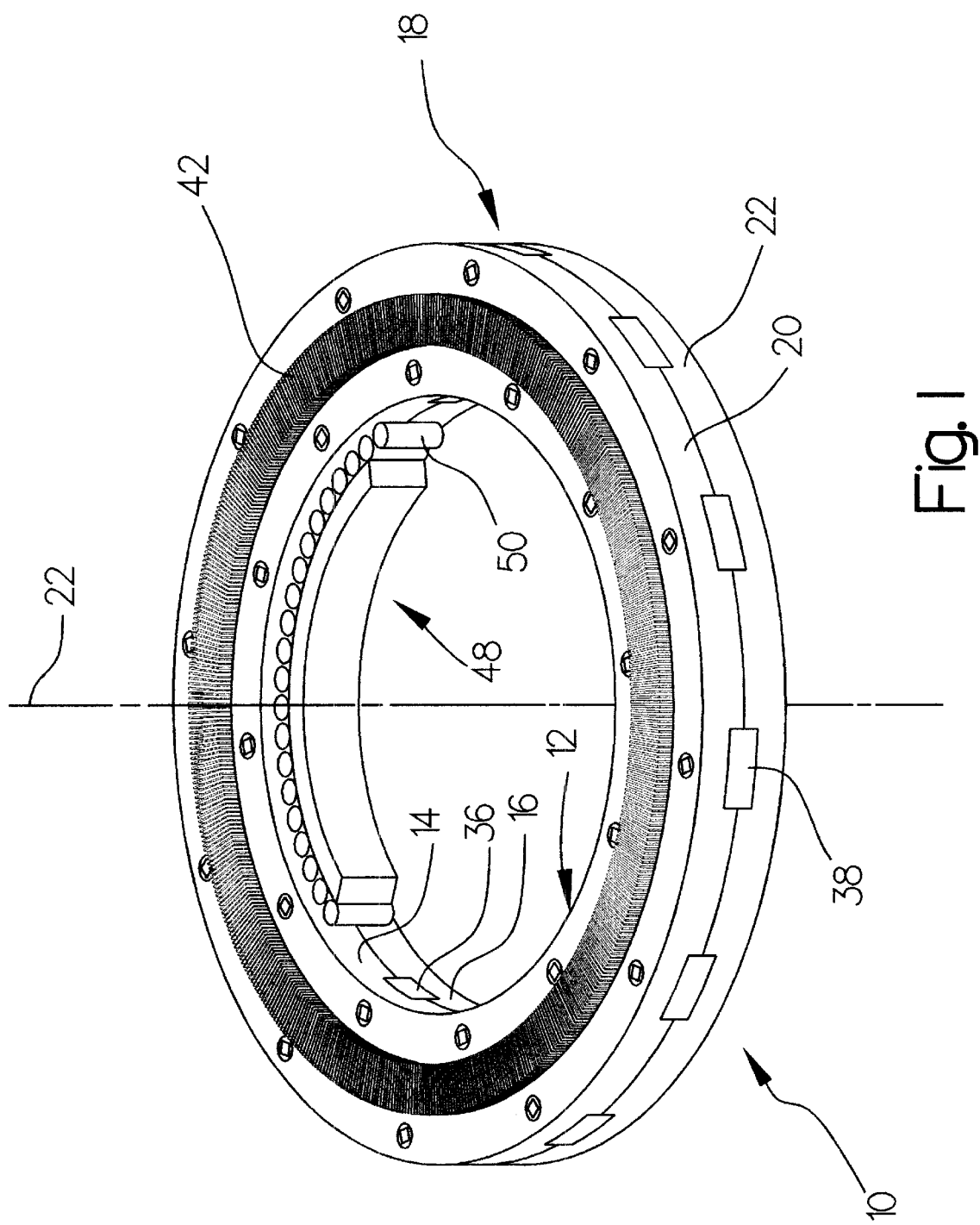
FIG. 1 is a perspective view of a transfer ring according to the present invention.

A transfer ring according to the present invention is generally illustrated by reference 10 in FIGS. 1, 2, 4, 5 and 6. The transfer ring 10 has an inner ring 12 made up of an upper part 14 and a lower part 16. The transfer ring 10 further has an outer ring 18 made up of an upper part 20 and a lower part 22. The inner ring 12 and outer ring 18 are substantially concentric with a transfer ring axis 22. A spacer ring 24 in FIGS. 2 and 3 extends between the inner ring 12 and the outer ring 18 and is substantially concentric therewith.

The spacer ring 24 has a plurality of spaced apart inwardly facing slots 26 extending into the inside circumference of the transfer ring ("inner slots"). A similar number of outwardly facing slots 27 extend into the outside circumference of the spacer ring 24 ("outer slots"). The inner outer slots, 26 and 27 respectively, alternate and do not overlap. Preferably the ends of the inner slots 26 and outer slots 27 are radially aligned.

The upper and lower parts, 14 and 16 respectively, of the inner ring 12 have corresponding notches 28 formed in their adjacent faces 30. When the upper and lower parts, 14 and 16 respectively, are secured to one another, the notches 28 align to define generally rectangular recesses extending radially into the inner ring 12.

Similarly the upper part 20 and lower part 22 of the outer ring 18 also have corresponding notches 32 formed in adjacent faces 34 thereof. The notches 32 align when the upper and lower parts, 20 and 22 respectively, are joined to define generally rectangular recesses extending radially into the outer ring 18.

Figure 4:
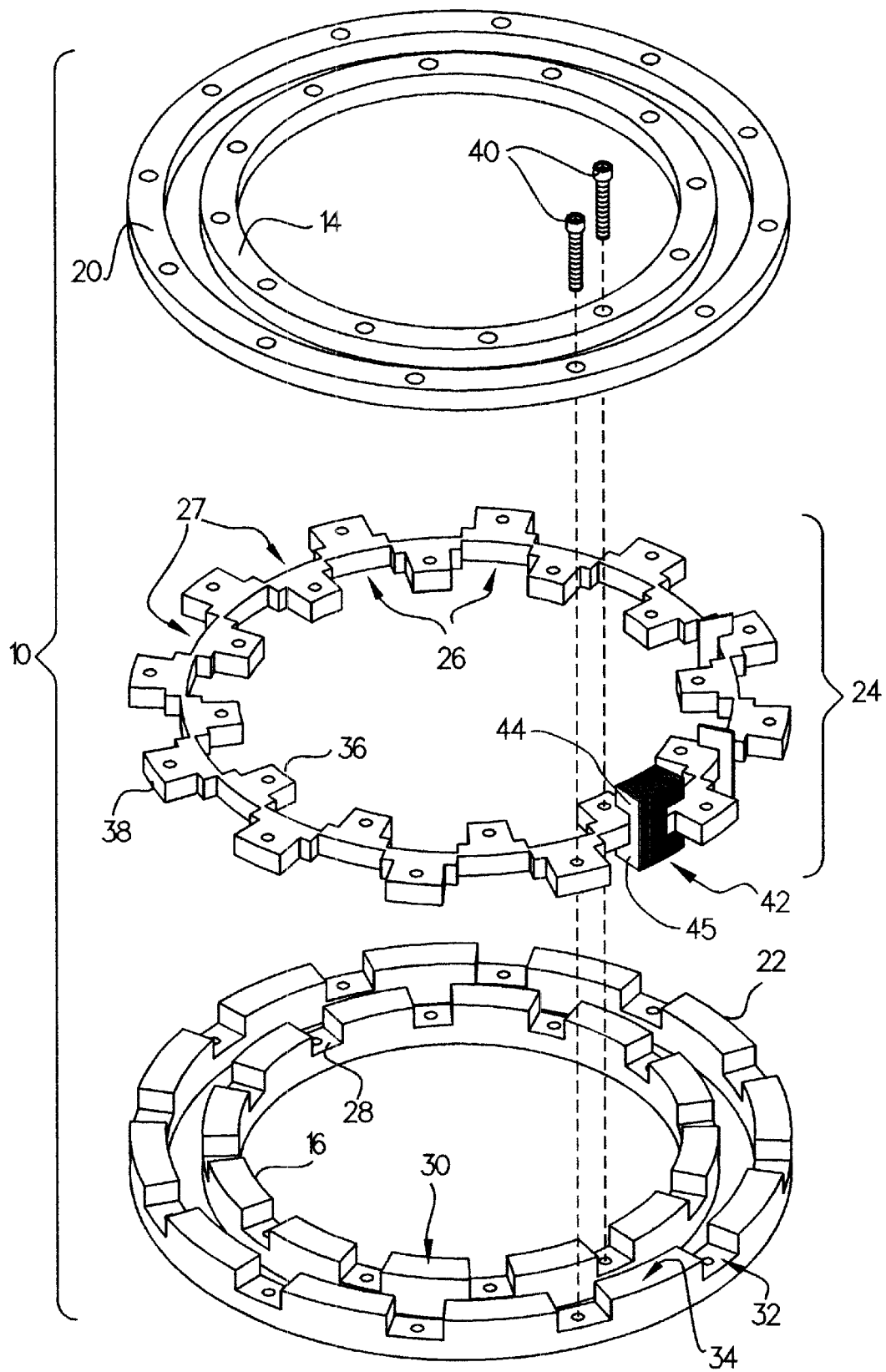
FIG. 4 is an exploded perspective view of an alternate embodiment of a transfer ring according to the present invention.

Alternatively, as illustrated in FIG. 4, the notches 28 and 32 respectively could extend into only one of the upper and lower parts 14 and 16 respectively of the inner ring 12 and only one of the upper and lower parts 20 and 22 respectively of the outer ring 18. An advantage of having each notch 28 and 32 extend respectively into both of the upper parts 14 and 20 and both of the lower pars 16 and 22 is interchangeability and reduction of parts. In other words, upper part 14 and lower part 16 may be identical and also upper part 20 and lower part 22 may be identical. Providing notches 28 and 32 in only the upper parts 14 and 20 or lower parts 16 and 22 respectively however halves the total number of notches which must be made.

The spacer ring 24 has inner teeth 36 extending radially inwardly between the inner slots 26. The spacer ring 24 further has outer teeth 38 extending radially outwardly between the outer slots 27. The inner teeth 36 register with the rectangular recesses defined between the notches 28 in the upper and lower parts, 14 and 16 respectively, of the inner ring 12. The outer teeth 38 register with the rectangular recesses defined between the notches 32 in the upper and lower parts, 20 and 22 respectively, of the outer ring 18. The recesses and inner teeth 36 and outer teeth 38 are preferably of close tolerance whereby upon assembly the spacer ring 24 locates the inner ring 12 and outer ring 18 to maintain all three rings substantially coaxial and to prevent relative movement therebetween.

Any suitable means may be used to secure the upper and lower parts of the inner ring 12 and outer ring 18 together. As illustrated, machine screws 40 extending through the upper parts 14 and 20, the inner teeth 36 or the outer teeth 38 of the transfer ring 24 and into the lower parts 16 and 22 respectively may be used. Other means may be suitable such as riveting or welding depending on the ease of subsequent disassembly which is desired. As the spacer ring 24 interacts with the notches 28 in the inner ring 12 and notches 32 in the outer ring 18 to locate the inner ring 12 and outer ring 18 relative thereto, there is no requirement for any alignment fixtures to be used during assembly in order to maintain concentricity of the component parts.

Figure 2:
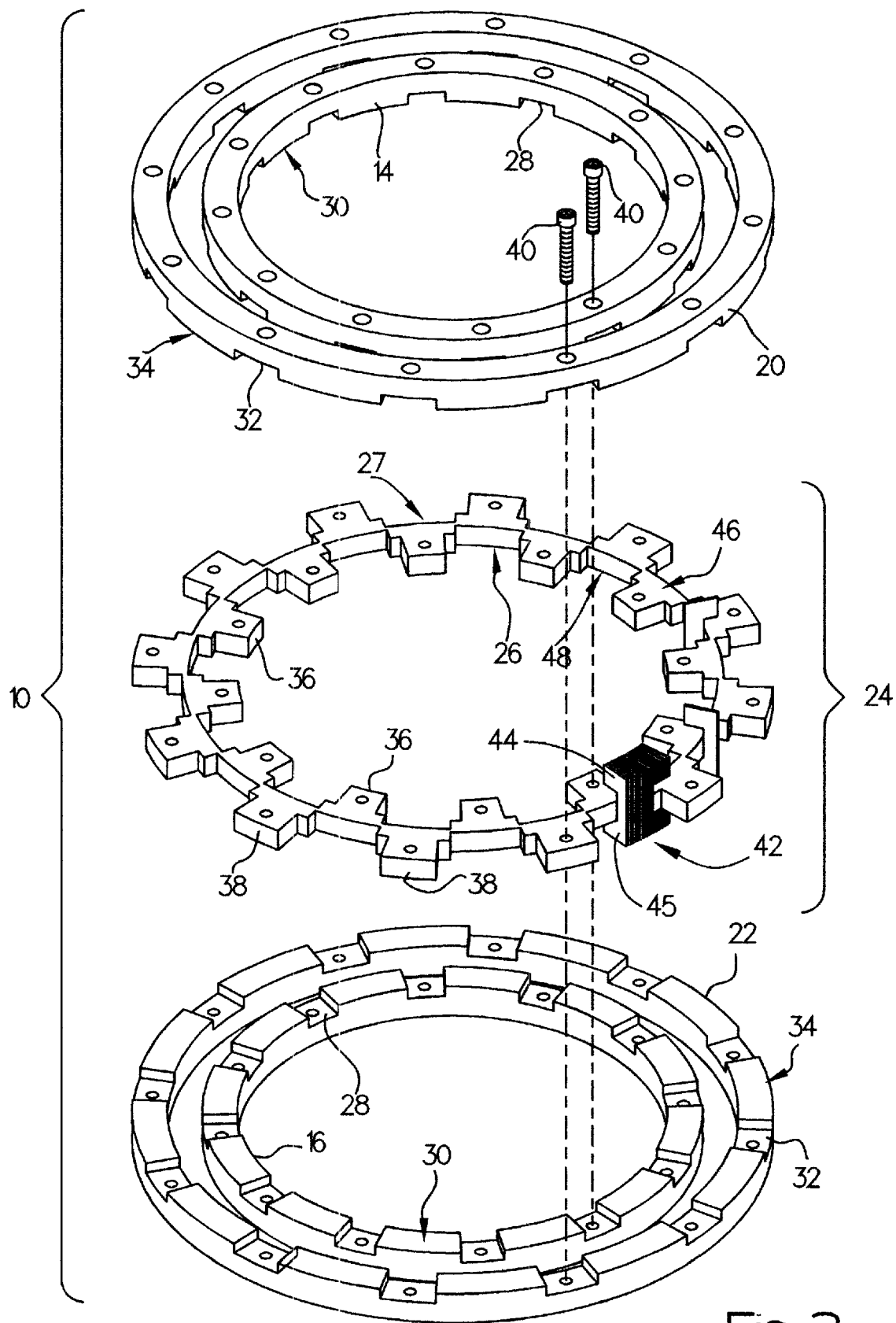
FIG. 2 is an exploded perspective view of a transfer ring according to the present invention.
Figure 3:
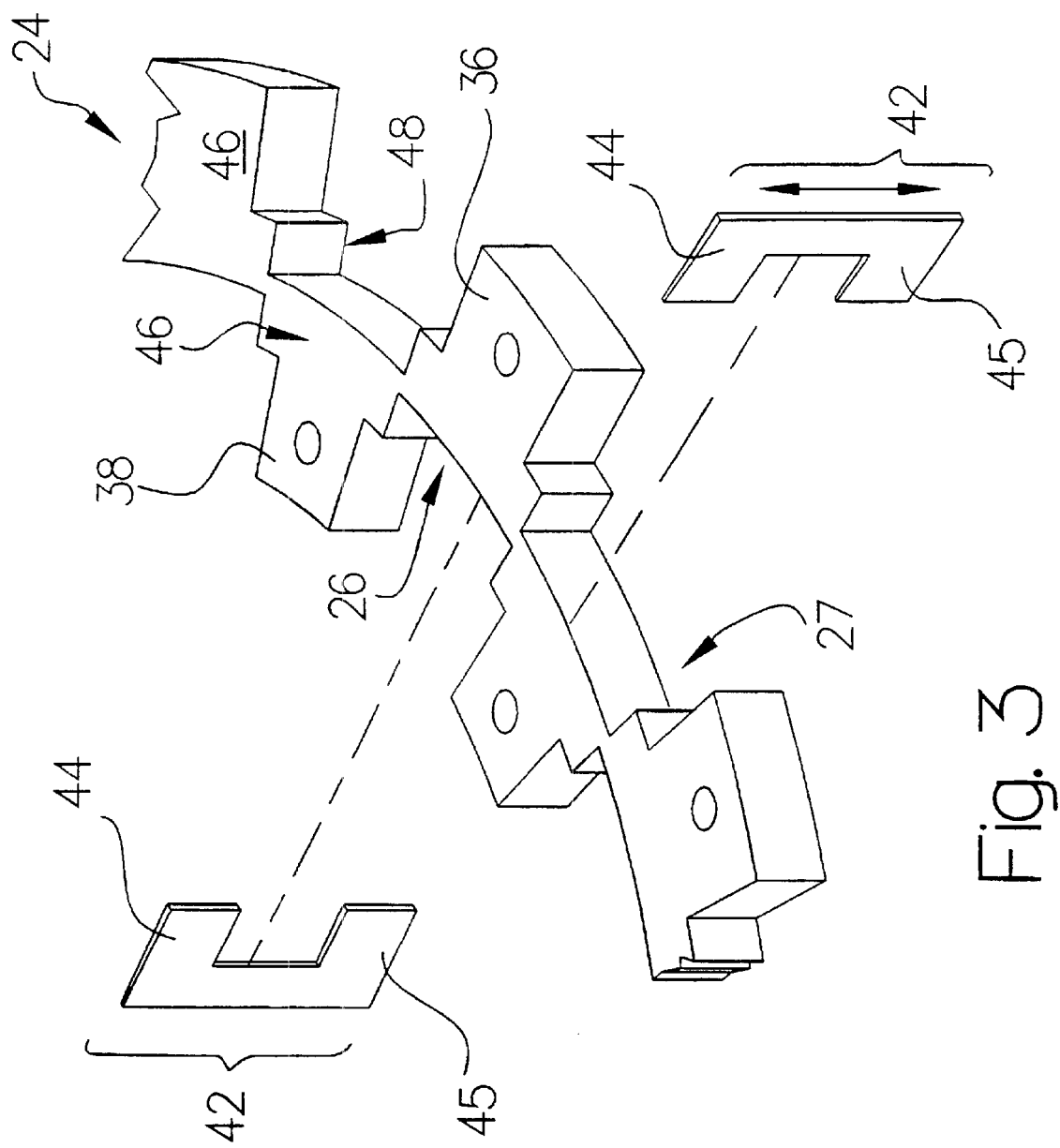
FIG. 3 is a perspective view of a segment of a spacer ring and two laminar segments.

Laminar segments 42 are located in the inner slots 26 and outer slots 27 of the spacer ring 24 and are carried by the spacer ring 24. The segments 42 are slidable in a direction generally parallel to the transfer ring axis 22. As best seen in FIG. 2, the segments 42 have a generally rectangular C shaped profile with upper tabs 44 and lower tabs 45 straddling upper and lower faces 46 and 48 respectively of the spacer ring 24 to limit the amount of slidable displacement of the segments 42. Preferably the segments 42 taper toward the transfer ring axis 22 (i.e. the segments 42 are slightly wedge-shaped) so that adjacent faces of the segments 42 are substantially parallel to minimize the clearance between the segments 42 and thereby minimize the space available for backlash.

The total inter-segmental space available for backlash is the total amount of space between segments 42 in two of the inner slots 26 or outer slots 27. As the outermost of segments 42 in each inner slot 26 or outer slot 27 will abut against the ends of the slot, the total amount of space available for backlash is not cumulative about the circumference of the spacer ring 24.

As the transfer ring 10 must rotate about the transfer ring axis 22, means should be provided to support and permit relatively free rotation of the transfer ring 10 about the transfer ring axis 22. FIG. 1 shows one manner in which this may be carried out by providing an inner bearing race 48 generally concentric with the inner ring 12 and providing rollers 50 (or alternatively balls which are not illustrated) between the inner race 48 and the inner ring 12.

The transfer ring arrangements illustrated in FIGS. 1, 2 and 4 would typically be utilized in CVT's having both input and output "gearsets" or "torque cones". For CVT's having only an input gearset or torque cone, a ring gear such as indicated by reference 50 in FIGS. 5 and 6 may be provided about the outer circumference of the outer ring 18.

Figure 5:
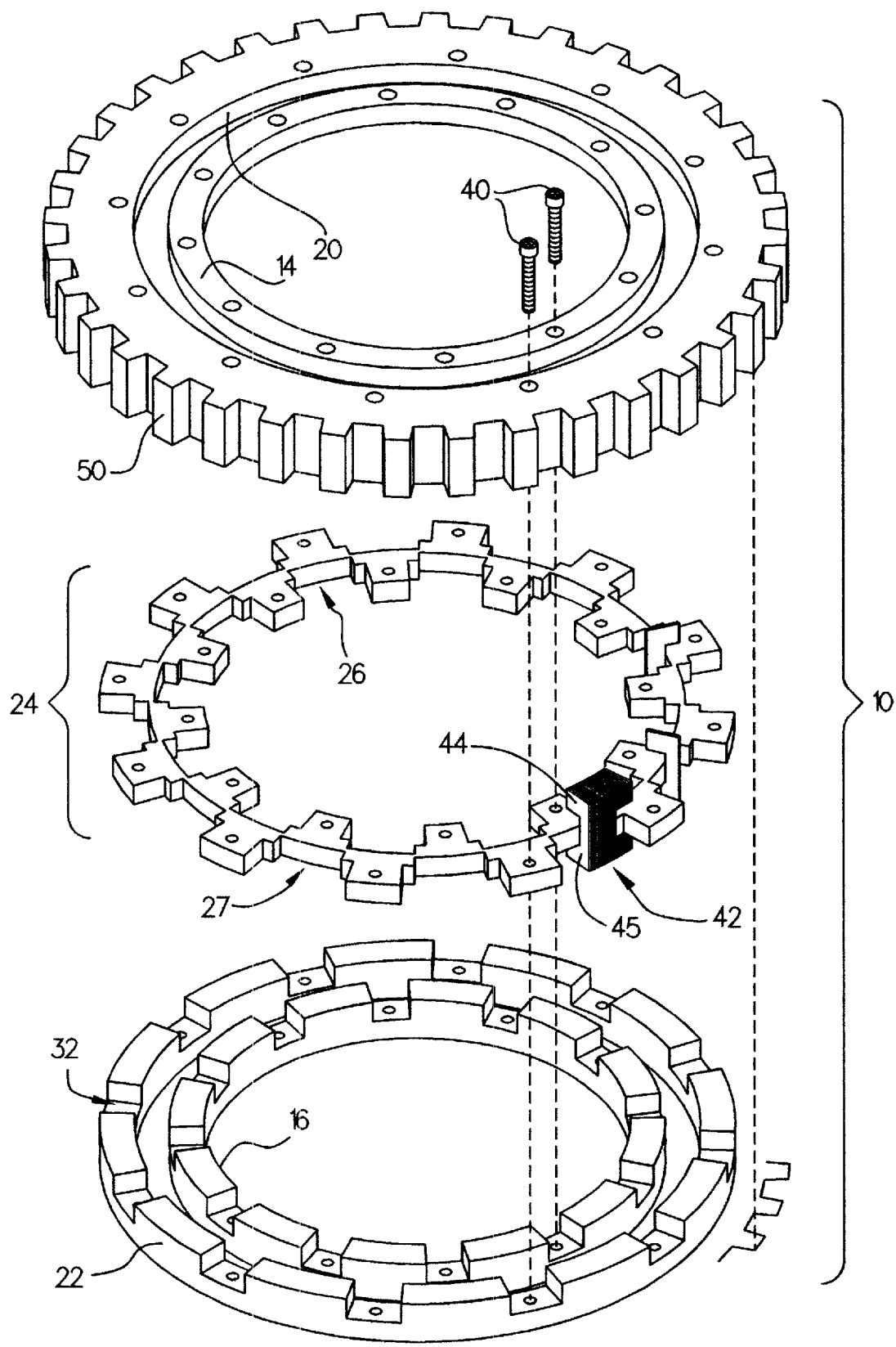
FIG. 5 is an exploded perspective view of a further alternative embodiment of a transfer ring according to the present invention.

In the FIG. 5 embodiment, the ring gear 50 is integral with the upper part 20 of the outer ring. The upper part 20 may be similar to the upper part 20 illustrated in the FIG. 4 embodiment to the extent that it lacks notches 32.

Figure 6:
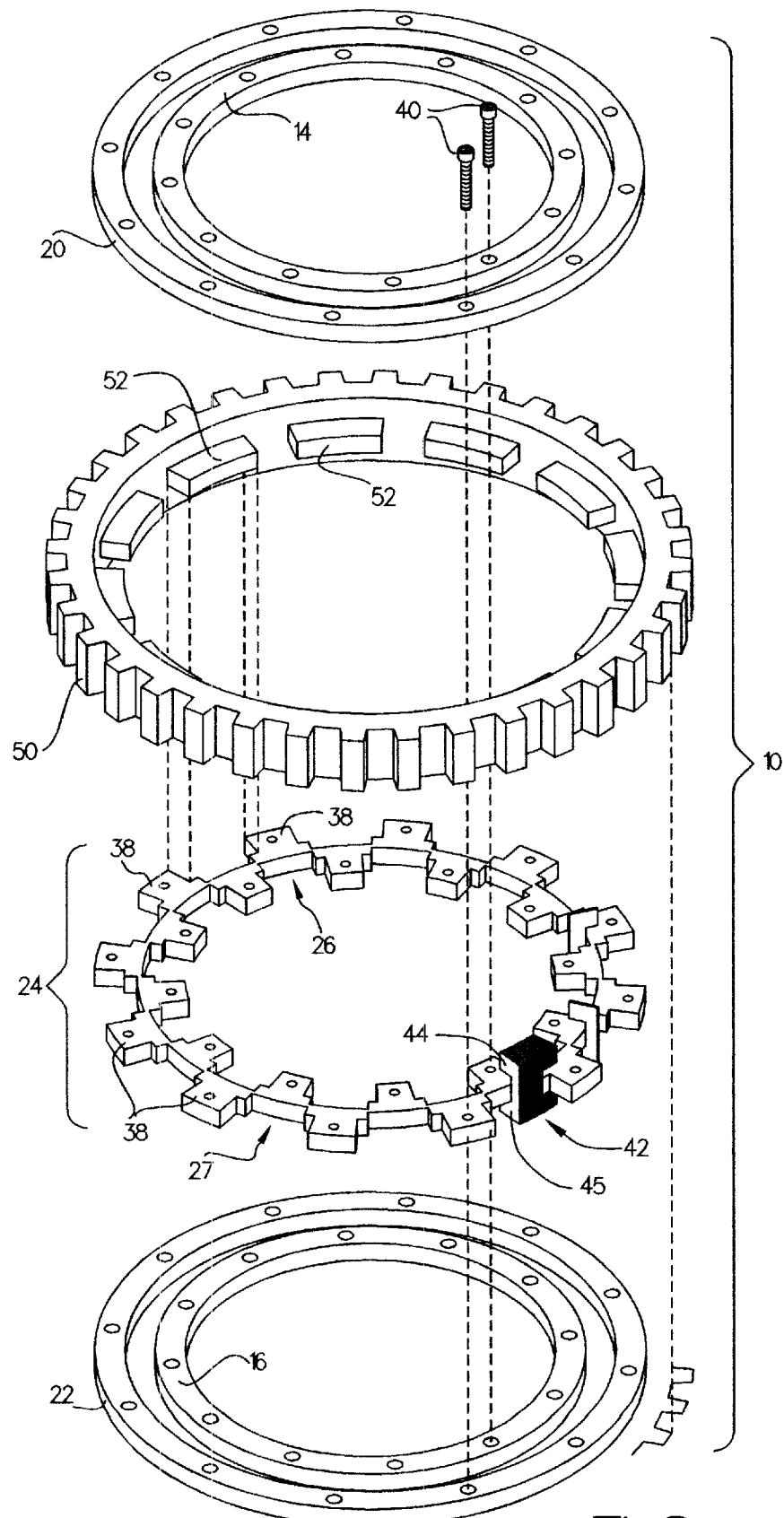
FIG. 6 is an exploded perspective view of yet another alternative embodiment of a transfer ring according to the present invention.

In the embodiment illustrated in FIG. 6, the ring gear 50 is mounted between an upper part 20 and a lower part 22 of the outer ring and no notches are provided in either the upper part 20 or lower part 22. The ring gear 50 has radially inwardly extending projections 52 which nest between the outer teeth 38 of the spacer ring 24 to rotationally couple the ring gear 50 with the spacer ring 24. The upper parts 14 and 20 and the lower parts 16 and 22 respectively of the inner ring 12 and outer ring 18 are secured to the spacer ring 24 by any suitable means such as machine screws 40. The projections 52 are trapped between the upper parts 14 and 20 and the lower parts 16 and 22 to prevent relative axial movement between the ring gear 50 and the spacer ring 24.

The above descriptive is intended in an illustrative rather than a restrictive sense. Variations to the exact description may be apparent to persons skilled in the relevant art without departing from the spirit and scope of the invention as defined by the claims set out below.

I claim:

1. A transfer ring for a continuously variable transmission, said transfer ring comprising:

an inner ring;

an outer ring;

a spacer ring;

said inner, outer and spacer rings being substantially coaxial with a transfer ring axis with said spacer ring disposed radially between said inner ring and said outer ring;

said inner and outer rings being secured to said spacer ring to substantially prevent relative movement therebetween;

said spacer ring having a plurality of alternating, non-overlapping, radially inwardly and radially outwardly facing slots extending respectively into inner and outer circumferences thereof; and, a plurality of laminar segments slidably mounted in each of said radially inwardly and radially outwardly facing slots, said segments being generally radially aligned with and slidable generally parallel to said transfer ring axis and having upper and lower tabs straddling said spacer ring to limit the distance said segments may be slidably displaced.

2. A transfer ring as claimed in claim 1 wherein:

said spacer ring is secured to said inner ring by inner teeth extending radially inwardly from said spacer ring and registering with mating recesses in said inner ring; and, said spacer ring is secured to said outer ring by outer teeth extending radially outwardly from said spacer ring and registering with mating recesses in said outer ring.

3. A transfer ring as claimed in claim 2 wherein each said inner and outer ring has an upper and a lower part and said mating recesses extend into at least one of said upper and said lower part.

4. A transfer ring as claimed in claim 2 wherein said segments taper toward said transfer ring axis to maintain adjacent faces substantially parallel.

5. A transfer ring as claimed in claim 3 wherein said segments taper toward said transfer ring axis to maintain adjacent faces substantially parallel.

6. A transfer ring as claimed in claim 4 wherein said outer ring has a radially outwardly facing ring gear extending about its outer circumference.

7. A transfer ring as claimed in claim 5 wherein said outer ring has a radially outwardly facing ring gear extending thereabout and integral with one of said upper part of said outer ring and said lower part of said outer ring.

8. A transfer ring as claimed in claim 1 wherein:

said outer ring has upper and lower parts;

said spacer ring has radially outwardly extending teeth about its outer circumference between said radially outwardly facing slots;

said radially outwardly extending teeth are situated between said upper and lower parts of said outer ring;

a ring gear extends circumferentially about said outer ring, said ring gear has inwardly facing projections which register with corresponding spaces between said radially outwardly extending teeth of said spacer ring to rotationally couple said ring gear to said spacer ring;

said inwardly facing projections are situated between said upper and lower parts of said outer ring; and said upper and lower parts of said outer ring act against said outwardly extending teeth and said projections to restrain relative axial movement between said ring gear and said spacer ring.

9. A transfer ring as claimed in claim 8 wherein said segments taper toward said transfer ring axis whereby adjacent faces of said segments are substantially parallel.

* * * * *